(12) United States Patent
Ha et al.

(10) Patent No.: US 10,159,241 B2
(45) Date of Patent: Dec. 25, 2018

(54) ANIMAL TRAP

(71) Applicants: Heung Yong Ha, Fairfax, VA (US); Peter J. Ha, Fairfax, VA (US)

(72) Inventors: Heung Yong Ha, Fairfax, VA (US); Peter J. Ha, Fairfax, VA (US)

( * ) Notice: Subject to any disclaimer, the term of this patent is extended or adjusted under 35 U.S.C. 154(b) by 75 days.

(21) Appl. No.: 14/857,495

(22) Filed: Sep. 17, 2015

(65) Prior Publication Data
US 2016/0073624 A1 Mar. 17, 2016

Related U.S. Application Data

(60) Provisional application No. 62/051,591, filed on Sep. 17, 2014.

(51) Int. Cl.
*A01M 23/20* (2006.01)

(52) U.S. Cl.
CPC .................. *A01M 23/20* (2013.01)

(58) Field of Classification Search
CPC ...... A01M 23/20; A01M 23/16; A01M 23/00; A01M 23/18
USPC ........................................................ 43/70–72
See application file for complete search history.

(56) References Cited

U.S. PATENT DOCUMENTS

| | | | | |
|---|---|---|---|---|
| 690,171 A * | 12/1901 | Mills | | |
| 1,011,207 A * | 12/1911 | Kemp | ........ | A01M 23/18 43/61 |
| 1,466,602 A * | 8/1923 | Longin | ........ | A01M 23/20 43/61 |
| 1,650,455 A * | 11/1927 | Lewis | ........ | A01M 23/20 43/61 |
| 1,678,178 A * | 7/1928 | Brophy | ........ | A01M 23/00 43/58 |
| 1,861,478 A * | 6/1932 | Kleffman | ........ | A01M 23/18 43/61 |
| 2,268,468 A * | 12/1941 | Adams | ........ | A01M 23/20 43/61 |
| 2,434,031 A * | 1/1948 | Adams | ........ | A01M 23/18 43/61 |
| 2,447,147 A * | 8/1948 | Warner | ........ | A01M 23/20 43/61 |
| 3,200,534 A * | 8/1965 | Wood | ........ | A01M 23/16 43/61 |
| 3,624,951 A * | 12/1971 | Gilbaugh | ........ | A01M 23/18 16/333 |
| 4,144,667 A | 3/1979 | Souza | | |
| 4,557,067 A | 12/1985 | Ha | | |
| 4,590,704 A * | 5/1986 | Volk | ........ | A01M 23/18 43/60 |
| 4,682,440 A * | 7/1987 | Hunter | ........ | A01M 23/20 43/61 |

(Continued)

FOREIGN PATENT DOCUMENTS

| | | | | |
|---|---|---|---|---|
| DE | 19857452 A1 * | 6/2000 | ........ | A01M 23/18 |
| GB | 1400301 A * | 7/1975 | ........ | A01M 23/04 |

*Primary Examiner* — Magdalena Topolski
(74) *Attorney, Agent, or Firm* — Birch, Stewart, Kolasch & Birch, LLP

(57) ABSTRACT

An animal trap having a housing including an open end, the open end having a bottom wall plate, both side wall plates and both side lateral guides; and a door slidably and movably mounted to the housing through the both side lateral guides for swinging upward and downward between an open position and a closed portion, whereby an animal that enters the housing through the door is automatically trapped.

10 Claims, 2 Drawing Sheets

(56) References Cited

U.S. PATENT DOCUMENTS

| | | | |
|---|---|---|---|
| 4,766,692 A * | 8/1988 | Shurden | A01M 23/20 43/61 |
| 4,829,700 A | 5/1989 | Ha | |
| 4,984,382 A * | 1/1991 | Yost | A01M 23/18 43/61 |
| 5,050,336 A | 9/1991 | Paassen | |
| 5,345,710 A * | 9/1994 | Bitz | A01M 23/20 43/61 |
| 6,189,490 B1 | 2/2001 | Jempolsky | |
| 6,484,436 B1 * | 11/2002 | Chang | A01M 23/20 43/61 |
| 6,484,672 B1 | 11/2002 | Versaw | |
| 6,543,179 B1 * | 4/2003 | Lee | A01M 23/20 43/60 |
| 6,564,501 B1 | 5/2003 | Schislyonok | |
| 6,609,327 B2 * | 8/2003 | Stoico | A01M 23/16 43/61 |
| 7,540,109 B2 * | 6/2009 | Hall | A01M 23/20 43/58 |
| 7,793,460 B2 | 9/2010 | Ha | |
| 2002/0011019 A1 * | 1/2002 | Stoico | A01M 23/16 43/58 |
| 2004/0107630 A1 * | 6/2004 | Evans | A01M 23/20 43/61 |
| 2008/0178516 A1 * | 7/2008 | Hall | A01M 23/20 43/61 |
| 2009/0107029 A1 * | 4/2009 | Ha | A01M 23/18 43/61 |
| 2016/0135444 A1 * | 5/2016 | Pomerantz | A01M 23/20 43/61 |
| 2016/0198697 A1 * | 7/2016 | Zhu | A01M 23/08 43/62 |

* cited by examiner

ANIMAL TRAP

CROSS-REFERENCE TO RELATED APPLICATIONS

This non-provisional application claims the benefit under 35 U.S.C. § 119(e) to U.S. Provisional Application No. 62/051,591, filed on Sep. 17, 2014, all of which are hereby expressly incorporated by reference into the present application.

BACKGROUND OF THE INVENTION

Field of the Invention

The present invention relates to an animal trap for trapping animals such as rats or squirrels which can be reused or disposed of without requiring handling of the animal rapped therein, and which can be easily assembled and taken apart.

Also, the present invention relates an animal trap which includes a housing having an open end, a door mounted to the housing and slidably movable between open positions by stopping through an elongated member stopped and closed position by falling downward.

An elongated member pivotally mounted to the housing for pushing a receiver connected to the elongated minimizer through animals in the housing and by releasing locked stopper, the door automatically closing the open end.

Description of the Background Art

Undesired animals such as rats or squirrels can become pests that spread diseases and harm farming, ranching and adversely affect the human life. Poisons are often used to kill these animals. Poisoned animals do not die right after consumption of the poison, but rather travel to unknown places and then die. Therefore, because it is difficult to locate and dispose of the dead poisoned animals, the dead animals start decomposing and emit odor.

For the reasons stated above, various types of animal traps are known in the art. For example, U.S. Pat. No. 4,144,667 issued to Souza, U.S. Pat. No. 5,050,336 issued to Paassen, U.S. Pat. No. 6,189,490 issued to Jempolsky, U.S. Pat. No. 6,484,672 issued to Versaw and U.S. Pat. No. 6,564,501 issued to Schislyonok.

One of the present inventors also discloses U.S. Pat. Nos. 4,557,067, 4,829,700, and U.S. Pat. No. 7,793,460.

However most patents having been complicated in construction and thus difficult and expensive to manufacture. Also, they often require the user to kill the trapped animal if the trapped animal is still alive, which is undesirable for the user.

The animal trap of the present invention is not subject to the above-mentioned disadvantages and possesses many advantages not found in the traps in use at the present time or in the past. For example, the trapped animals within the animal trap of the present invention are automatically killed by insufficient oxygen in the housing due to the tightly closed open end.

SUMMARY OF THE INVENTION

Accordingly, it is an object of the present invention to provide an animal trap with eliminates the above problems encountered with conventional animal traps.

Another object of the present invention is to provide an animal trap which includes a rectangular housing having an open end and both side lateral guides disposed at both sides the of the open end, and door slidably and movably mounted on the both side lateral guides for tightly closing or opening the open end, and an elongated member pivotally mounted on the rectangular housing for falling downward when the trapped animal pushes the end portion of the elongated member.

A further object of the present invention is to provide an animal trap which includes an open end, and a door for slidably movable up and down through both side lateral guides, the door having a handle extended from the above outside portion thereof and a close stopper extended from above inside portion thereof. And a pivotal elongated member has an elongated member stopper disposed at the upper end portion thereof for locking or unlocking with the closer stopper and a receiver extends from the down end portion thereof for lightly closing the end open through the door by being pushed by the trapped animal stepped on the receiver.

Still another object of the present invention is to provide an animal trap which has a simple structure, a pretty external appearance, and a door that can automatically and tightly close an open end of a rectangular housing for immediately trapping an undesired animal and automatically killing the undesired animal within the rectangular housing due to insufficient oxygen.

Other objects and further scope of applicability of the present invention will become apparent from the detailed description given hereinafter. It should be understood, however, that detailed description and specific examples, while indicating preferred embodiments of the invention, are given by way of illustration only, since various changes and modification within the spirit and scope of the invention will become apparent to those skilled in the art from the detailed description.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
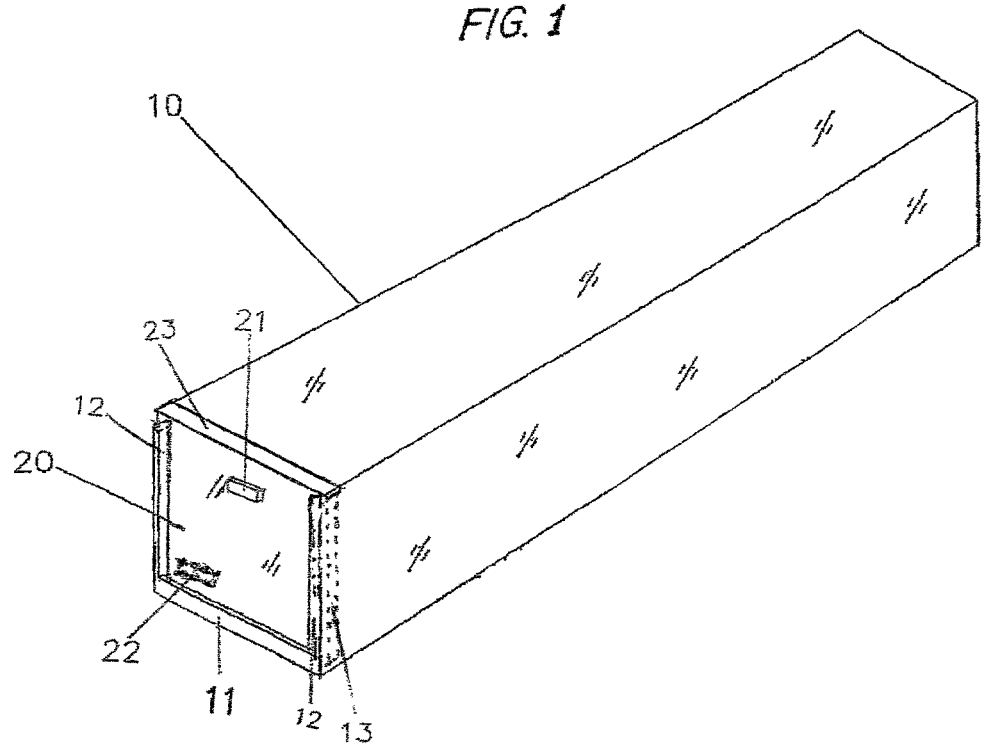
FIG. 1 is a perspective view of an animal trap in accordance with an embodiment of the present invention, after assembly.

Referring now to the drawings, wherein like reference numerals designate identical or corresponding parts throughout the several views, and more particularly to FIG. 1 thereof, obviously, numerous modifications and variations of the present invention are possible in light of the above teachings. It is therefore to be understood that within the scope of the appended claims, the invention may be practiced otherwise than as specifically described herein.

Figure 2:
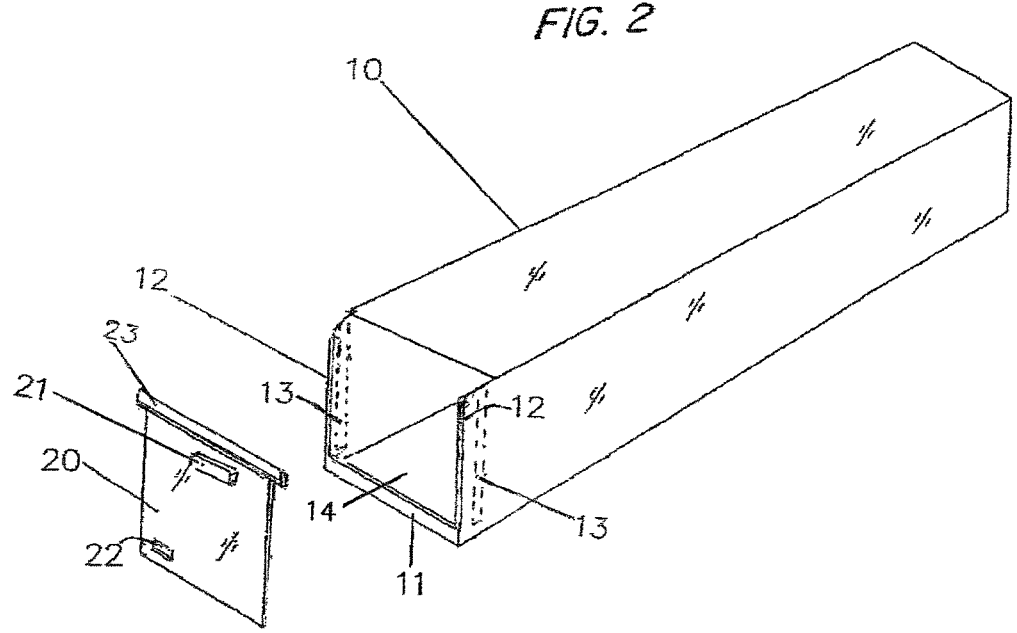
FIG. 2 is a perspective view of the animal trap, before the assembly, according to an embodiment of the present invention.

As shown in FIGS. 1 and 2, the animal trap of the present invention comprises a rectangular housing 10 including only one end open 14 where an animal (or an object to be trapped) can enter and a weighty door 20 installed at the end open 14. Thus, an animal that entered into the animal trap through the door 20 cannot exit the animal trap without going through the door 20. All the components of the animal trap according to the embodiments of the present invention are operatively coupled and configured. Further the present invention is not limited to trapping animals only and can be fully applied to any object desired to trap.

Figure 3:
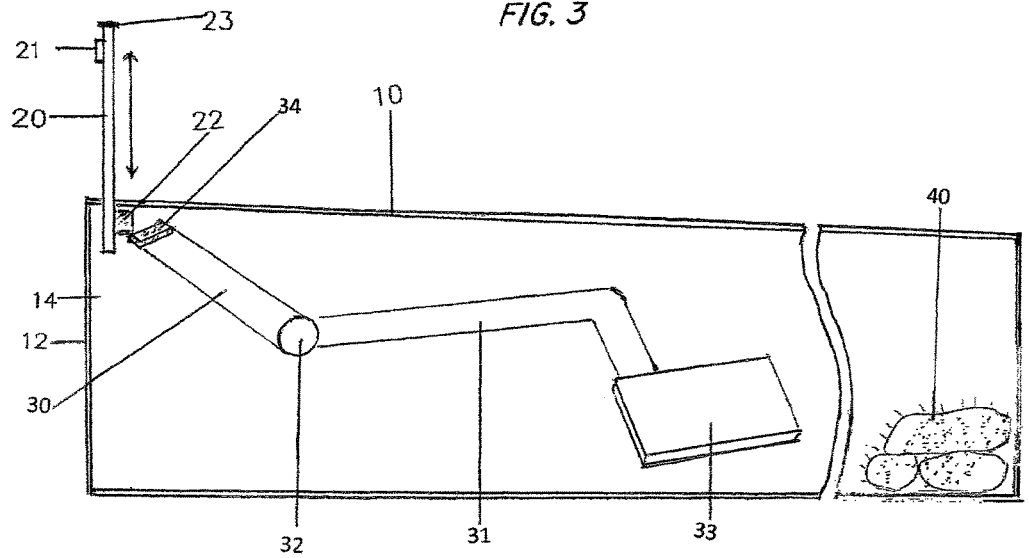
FIG. 3 is a side view of the animal trap in operation according to an embodiment of the present invention.
Figure 4:
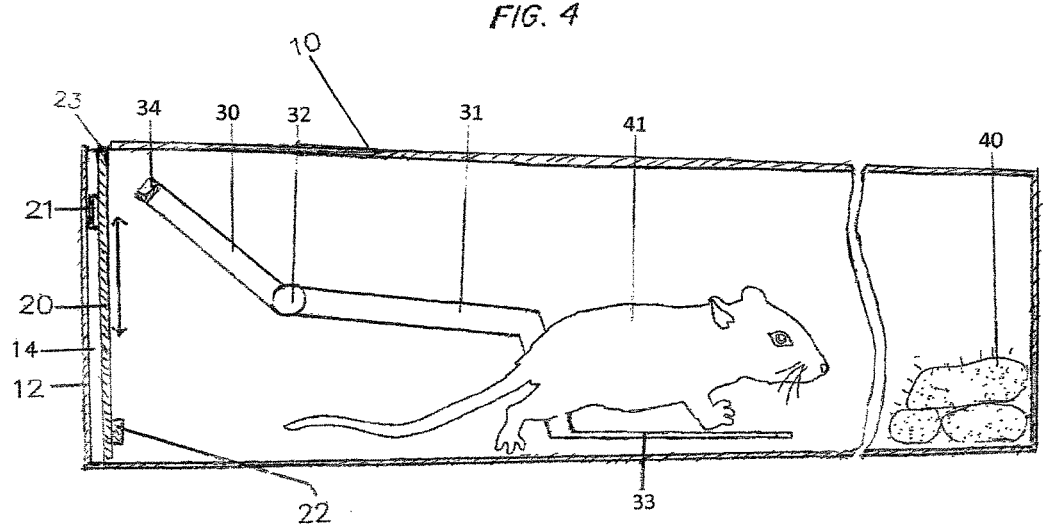
FIG. 4 is a side view of the animal trap in operation according to an embodiment of the present invention.

Referring FIGS. 1 and 2, the door 20 is slidably removed upward by pushing a handle 21 attached on outside thereof through both side lateral guides 13 disposed at both side portions of the end open 14 of the rectangular housing 10 as shown in FIGS. 3 and 4. Also the door 20 further includes a close stopper 22 disposed at inside thereof and a top plate hanger 23 extended from a top portion thereof for hanging on both side top portion of the end open 14 of the rectangular housing 10. That is, the close stopper 22 is not positioned on the same side as where the handle 21 is located on the door 20 but is located on the other side (inside) of the door so the close stopper 22 may not be visible to a user facing the handle 21 (see FIGS. 3 and 4 to be described below). FIGS. 1 and 2 merely illustrate that the door 20 has the close stopper 22 on the inside of the door 20.

The end open 14 of the rectangular housing 10 includes a bottom plate 11 disposed at bottom portion of the end open 14 and both side wall plates 12 disposed both side portions of the end open 14 having both side lateral guides 13, disposed within the both side wall plates 12 as shown in FIGS. 2 and 4. Therefore, the door 20 can slidably be moved to upward or downward through the both side lateral guides 13.

Referring to FIGS. 3 and 4, a first elongated member 30 in the rectangular housing 10 is pivotally attached to an elongated pivot 32 and a second elongated member 31 is pivotally attached to the same elongated pivot 32. The elongated pivot 32 is mounted to one inside wall of the rectangular housing 10. The second elongated member 31 has a receiver 33 attached to end portion thereof, which is pushed downward by a trapped animal 41 that has entered the housing 10 to eat a bait 40 placed at an opposite inside of the end open 14 of the housing 10 or that has entered the housing due to the smell of the bait 40 (FIG. 4). An elongated stopper 34 is provided at an end portion of the first elongated member 30 for locking or unlocking with the close stopper 22 of the door 20. The member stopper 34 is recessed in the end portion of the first elongated member.

When the animal trap of the present invention is set, as shown in FIG. 3, the weighty door 20 swings up by the user pushing up the handle 21 of the door 20, and the door 20 at the upwardly pushed position is locked with the elongated member stopper 34 of the first elongated member 30 by the close stopper 22 of the door 20. Since the door 20 is opened, then an undesired animal such as a rat 41 can easily enter the rectangular housing 10.

As shown in FIG. 4, when the animal 41 enters into the rectangular housing 10 through the open end 14, the door 20 immediately closes itself due to the unlocking that occurs between the close stopper 22 and elongated member stopper 34 (e.g., by the animal stepping on the receiver 33). Since the first elongated member 30 pivotally swings downward and the close stopper 22 is released from the elongated member stopper 34, the weighty door 20 slidably and immediately swings down through the both side lateral guides of the rectangular housing 10. This traps the animal 41 that is inside the housing 10. Even if the trapped animal 41 attempts to exit the housing 10, the door 20 is securely maintained in the closed position by the tightly attached both side lateral guides 13 of the rectangular housing 10.

Although the rectangular housing 10 is discussed, the housing 10 can have a different shape according to the embodiments of the present invention.

The animal trap according to the embodiments of the present invention is a simple and effective animal trap to trap undesired animals such as rats, squirrels, or any other undesired animals or objects. Because the animal trap is enclosed except at the open end covered by the door, an animal trapped inside cannot exit the animal trap. Therefore, once the undesired animal/object is trapped in the animal trap of the present invention, suffocation and/or dehydration, deer ticks and virus carried on the trapped animal, and insufficient oxygen in the close rectangular housing, will eventually kill the animal, e.g., in approximately two days. This is advantageous because the user does not need to kill the trapped animal, but rather can wait till the animal dies of suffocation or dehydration inside the animal trap.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed:

1. An animal trap comprising:
   a housing including an open end, the housing including a bottom wall plate, a rear wall plate opposite the open end, two side wall plates, and a top wall plate, wherein each side wall plate includes a side lateral guide;
   a door slidably and movably mounted to the housing through the side lateral guides for swinging upward and downward between an open position and a closed portion to open and close the open end, whereby an animal that enters the housing through the door is automatically trapped, the door including a door stopper on an inner surface of the door; and
   a single elongated member pivotally attached to only one of the two side wall plates by a fixed pivot, the elongated member having a first elongated portion extending towards the open end and a second elongated portion extending towards the rear wall plate, the first elongated portion having an end closest to the door, and the end closest to the door having a member stopper, the member stopper being recessed in the end closest to the door for locking or unlocking with the door stopper when the door stopper is received in or released from the member stopper, respectively,
   wherein the door stopper is offset on the inner surface of the door so as to be closer to the said only one of the two side walls than to a center of the door in a width direction of the door,
   wherein the second elongated portion includes a receiver extended from an end portion thereof for receiving the animal, and
   wherein only a first side of the receiver is connected to the end portion of the second elongated portion and a second side of the receiver spaced from the first side is pivotable in an arc about the fixed pivot.

2. The animal trap of claim 1, wherein the door further comprises a handle on an outer surface of the door.

3. The animal trap of claim 1, wherein, when the animal steps on the receiver of the second elongated portion, the door is automatically moved downward to tightly close the open end by releasing a locked position between the member stopper of the first elongated portion and the door stopper.

4. The animal trap of claim 1, wherein the housing has a rectangular form.

5. The animal trap of claim 1, wherein the door stopper is located on a lower portion of the inner surface of the door.

6. The animal trap of claim 1, wherein, when the door stopper is received in the member stopper, the receiver is located below the pivot.

7. The animal trap of claim 1, wherein the elongated member is located entirely within the housing.

8. The animal trap of claim 1, wherein the housing is air-tight when the door is lowered.

9. The animal trap of claim 1, wherein the top wall plate, the bottom wall plate, the rear wall plate and the side wall plates are free of holes.

10. The animal trap of claim 1, wherein a length of the first elongated portion from the fixed pivot to the stopper member is less than a length of the second elongated portion from the fixed pivot to the receiver.

* * * * *